United States Patent
Wang et al.

(10) Patent No.: US 12,512,566 B2
(45) Date of Patent: Dec. 30, 2025

(54) ALUMINUM-CASED CYLINDRICAL BATTERY STRUCTURE WITH ELECTROLYTE INJECTED AT POLE TERMINAL

(71) Applicant: YANTAI LIHUA ELECTRIC POWER TECHNOLOGY CO., LTD., Yantai (CN)

(72) Inventors: Hanchao Wang, Yantai (CN); Shaohui Xu, Yantai (CN); Xiaolei Yu, Yantai (CN); Weiqiang Ren, Yantai (CN); Mingchao Liu, Yantai (CN)

(73) Assignee: YANTAI LIHUA ELECTRIC POWER TECHNOLOGY CO., LTD., Yantai (CN)

( * ) Notice: Subject to any disclaimer, the term of this patent is extended or adjusted under 35 U.S.C. 154(b) by 0 days.

(21) Appl. No.: 19/260,204

(22) Filed: Jul. 3, 2025

(65) Prior Publication Data

US 2025/0392019 A1    Dec. 25, 2025

Related U.S. Application Data

(63) Continuation of application No. PCT/CN2025/102649, filed on Jun. 23, 2025.

(30) Foreign Application Priority Data

Jun. 25, 2024    (CN) .......................... 202421467608.0

(51) Int. Cl.
*H01M 50/186*    (2021.01)
*H01M 10/04*    (2006.01)
(Continued)

(52) U.S. Cl.
CPC ..... *H01M 50/567* (2021.01); *H01M 10/0431* (2013.01); *H01M 50/107* (2021.01); *H01M 50/119* (2021.01); *H01M 50/169* (2021.01); *H01M 50/186* (2021.01); *H01M 50/474* (2021.01); *H01M 50/486* (2021.01);
(Continued)

(58) Field of Classification Search
None
See application file for complete search history.

(56) References Cited

U.S. PATENT DOCUMENTS

2001/0031391 A1\*  10/2001  Hironaka .......... H01M 10/0525
                                                      429/231.1

FOREIGN PATENT DOCUMENTS

| CN | 208272052 U | 12/2018 |
| CN | 220692148 U | 3/2024 |
| CN | 220934247 U | 5/2024 |

\* cited by examiner

*Primary Examiner* — Haixia Zhang

(57) ABSTRACT

The present application relates to the technical field of cylindrical battery, and in particular, to an aluminum-cased cylindrical battery structure with electrolyte injected at the pole terminal. The cylindrical battery structure includes a casing equipped with a wound core therein, with the top of the wound core serving as a negative terminal and the bottom of the wound core serving as a positive terminal, the positive terminal includes a cover, the edge of the cover is laser-welded to the bottom of the casing, the bottom of the cover is laser-welded to a positive tab of the wound core, and an explosion-proof valve is disposed at the middle portion of the cover; and an electrolyte injection hole is disposed in the middle of the negative current collector plate and the stud for electrolyte injection.

10 Claims, 2 Drawing Sheets

(51) Int. Cl.
*H01M 50/107* (2021.01)
*H01M 50/119* (2021.01)
*H01M 50/169* (2021.01)
*H01M 50/474* (2021.01)
*H01M 50/486* (2021.01)
*H01M 50/536* (2021.01)
*H01M 50/548* (2021.01)
*H01M 50/567* (2021.01)
*H01M 50/645* (2021.01)

(52) U.S. Cl.
CPC ....... *H01M 50/536* (2021.01); *H01M 50/548* (2021.01); *H01M 50/645* (2021.01)

ALUMINUM-CASED CYLINDRICAL BATTERY STRUCTURE WITH ELECTROLYTE INJECTED AT POLE TERMINAL

TECHNICAL FIELD

The present application relates to the technical field of cylindrical battery, and in particular, to an aluminum-cased cylindrical battery structure with electrolyte injected at the pole terminal.

BACKGROUND

Currently, in the production and manufacturing process of aluminum-cased cylindrical batteries, the negative terminal is generally constructed by riveting the nickel-plated copper pole to the aluminum casing, laser-welding the negative current collector plate to the negative tab of the wound core, then inserting a copper needle from the inside of the wound core to perform resistance welding on the negative current collector plate and the nickel-plated copper pole, and then injecting the electrolyte. During the electrolyte injection, the cylindrical battery needs to be flipped 180 degrees to inject the electrolyte from the positive terminal. After electrolyte injection and formation are completed, the positive terminal is assembled. Currently, the positive terminal is generally constructed by riveting the cover to the transition tab, welding one end of the transition tab to the positive current collector plate of the wound core, laser welding the positive current collector plate to the positive tab of the wound core, and then bending the transition tab to fasten the cover onto the casing for peripheral welding. The defects of the existing structural form are as follows: the welding slag generated by the internal welding of the negative terminal wound core cannot be effectively removed, the overcurrent capacity is generally poor, and the riveting method of the negative pole has poor flexibility for use at the pack end due to the single material; the cover at the positive terminal and the transition tab have complex structural designs and high costs, and the bending of the transition tab occupies a considerable amount of internal space in the cylindrical battery; moreover, during the production process, cylindrical batteries need to be flipped multiple times, which makes the production process complex and increases the investment cost of equipment at the same time.

In summary, the foregoing problems of the negative terminal and positive terminal of the aluminum-cased cylindrical battery have already become pressing technical difficulties in the industry.

SUMMARY

To make up for the deficiencies in existing technologies, the present application provides an aluminum-cased cylindrical battery structure with electrolyte injected at the pole terminal, which solves the problems of difficult removal of welding slag inside the negative terminal, poor overcurrent capacity and poor flexibility for use at the pack end in the past, also solves the problems of complex design, high cost and large occupation of internal space of the cylindrical battery in the positive terminal structure in the past, as well as solves the problem that the cylindrical battery needs to be flipped multiple times in the previous production process.

The technical solution adopted in the present application to resolve the foregoing technical problems is as follows:

An aluminum-cased cylindrical battery structure with electrolyte injected at the pole terminal, which includes a casing equipped with a wound core therein, with the top of the wound core serving as a negative terminal and the bottom of the wound core serving as a positive terminal, wherein the negative terminal includes a negative current collector plate laser-welded to a negative tab of the wound core, a central portion of the negative current collector plate is laser-welded to a stud flange located at the bottom of a stud, a lower insulating sheet is disposed between the negative current collector plate and the casing, a sealing gasket is disposed between the stud, the stud flange and the casing, the stud extends upward through a central hole of the casing and is threadedly connected to a nut provided on an outer side of the casing, an upper insulating sheet is disposed between the nut and the casing, and the threaded engagement portion between the nut and the stud is laser-welded;

the positive terminal comprises a cover, the edge of the cover is laser-welded to the bottom of the casing, the bottom of the cover is laser-welded to a positive tab of the wound core, and an explosion-proof valve is disposed at the middle portion of the cover;

an electrolyte injection hole is disposed in the middle of the negative current collector plate and the stud for electrolyte injection, after electrolyte injection and formation, a sealing plug is inserted into the electrolyte injection hole of the stud, and the top end of the sealing plug is laser-welded to the stud.

The upper portion of the electrolyte injection hole of the stud is a polygonal hole for locking and fixation, and the lower portion thereof is a circular hole.

The upper portion of the sealing plug is a polygonal boss matched with the polygonal hole, and the lower portion thereof is a cylinder matched with the circular hole.

The nut is matched with the stud flange to clamp and fix the upper insulating sheet, the casing, and the sealing gasket.

The nut is flush with the top end of the stud, and the stud is flush with the top end of the sealing plug.

The lower insulating sheet is configured to isolate the short-circuit mode between the negative current collector plate and the casing.

The sealing gasket is configured to isolate the short-circuit mode between the stud, the stud flange and the casing.

The upper insulating sheet is configured to isolate the short-circuit mode between the nut and the casing.

The nut is made of aluminum, copper, nickel or nickel-plated copper, and the sealing plug is made of nickel-plated copper.

The upper insulating sheet and lower insulating sheet are made of PP or PET.

The present application adopts the foregoing solution and has the following advantages:

At the negative terminal, the negative current collector plate is laser-welded to the stud flange at the bottom of the stud, the stud extends upward through the central hole of the casing and is threadedly connected to the nut provided on an outer side of the casing, avoiding the generation of welding slag during internal welding and ensuring the overcurrent capacity. The nut can be made of various materials as needed to match the application requirements at the pack end, with a wide range of applications and strong compatibility with production lines.

At the positive terminal, only the cover and the explosion-proof valve need to be arranged, simplifying the structure, greatly reducing the cost of structural components, and at the same time achieving full utilization of the internal space of the battery cell.

An electrolyte injection hole is disposed in the middle of the negative current collector plate and the stud for electrolyte injection, chaning the previous bottom electrolyte injection to top electrolyte injection, reducing the number of times the cylindrical battery be flipped, simplifying the process and lowering the equipment investment cost. After electrolyte injection and formation, the sealing plug is inserted into the electrolyte injection hole of the stud, and the top end of the sealing plug is laser-welded to the stud, effectively ensuring the reliability of sealing and electrical connection.

Figure 1:
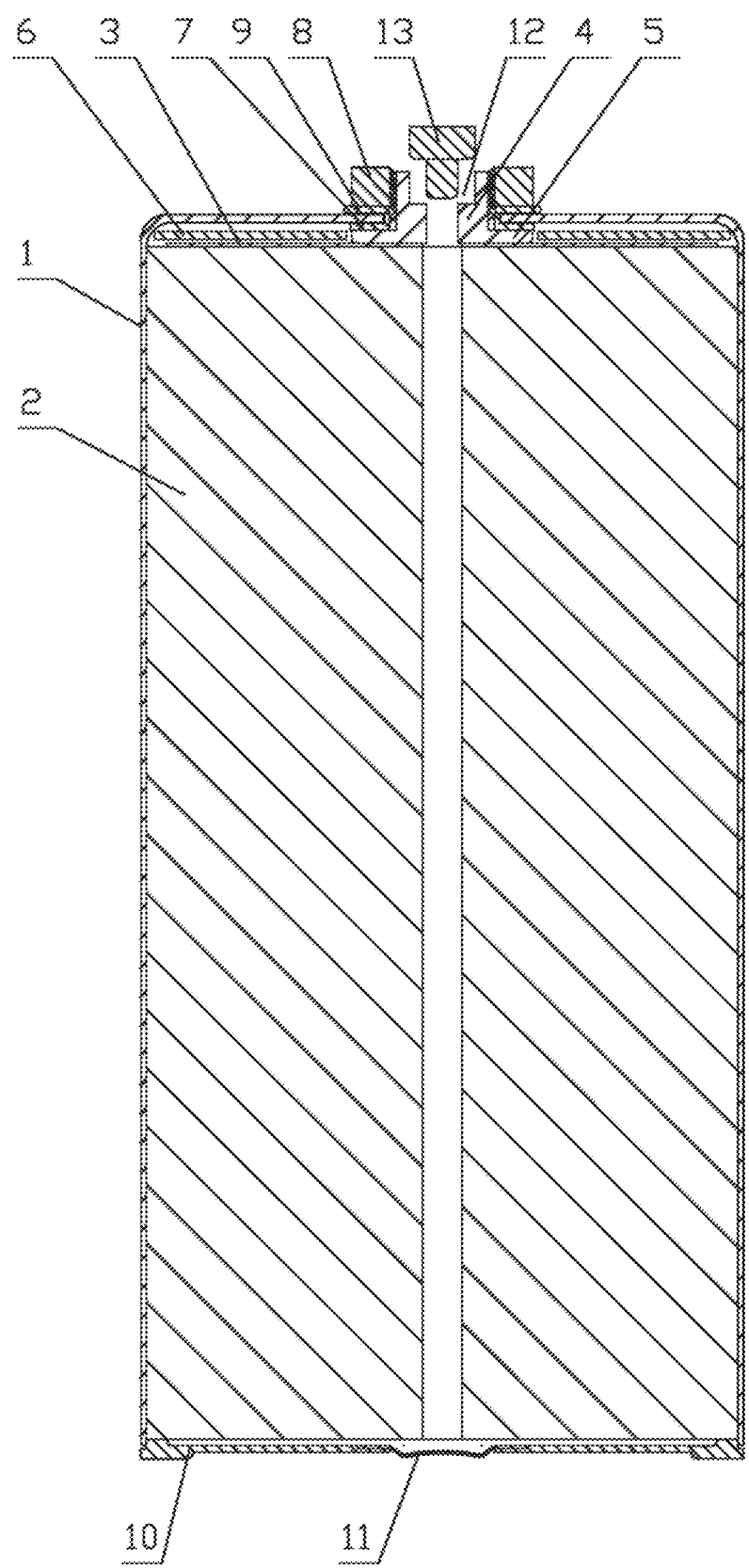
FIG. 1 is a schematic structural cross-sectional view according to the present application.

In the drawings: 1. casing, 2. wound core, 3. negative current collector plate, 4. stud, 5. stud flange, 6. lower insulating sheet, 7. sealing gasket, 8. nut, 9. upper insulating sheet, 10. cover, 11. explosion-proof valve, 12. electrolyte injection hole, and 13. sealing plug.

DESCRIPTION OF THE EMBODIMENTS

To clearly describe the technical features of the solution, the following is a detailed description of the present application through specific embodiments and in conjunction with the accompanying drawings thereof.

Figure 2:
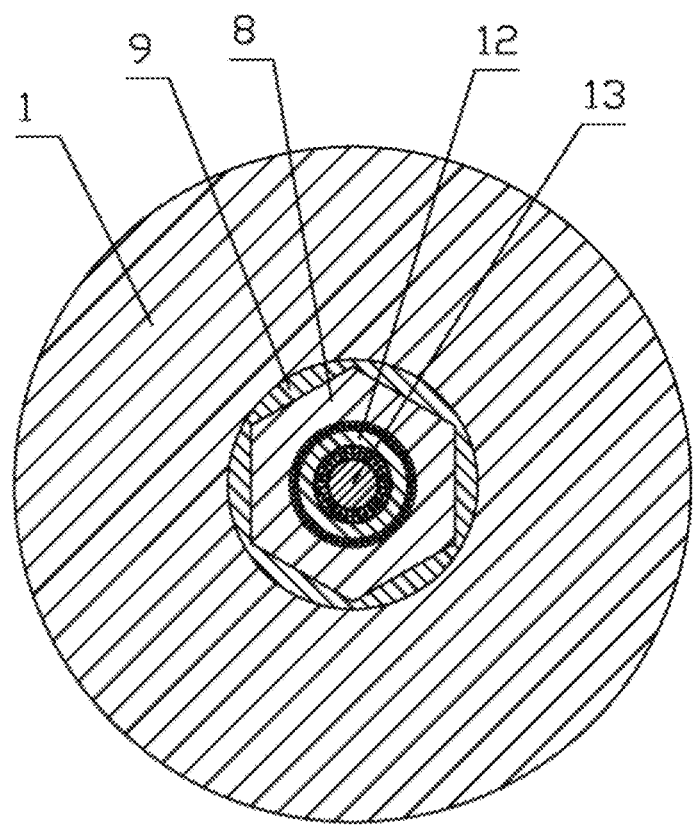
FIG. 2 is a schematic structural top view according to the present application.
Figure 3:
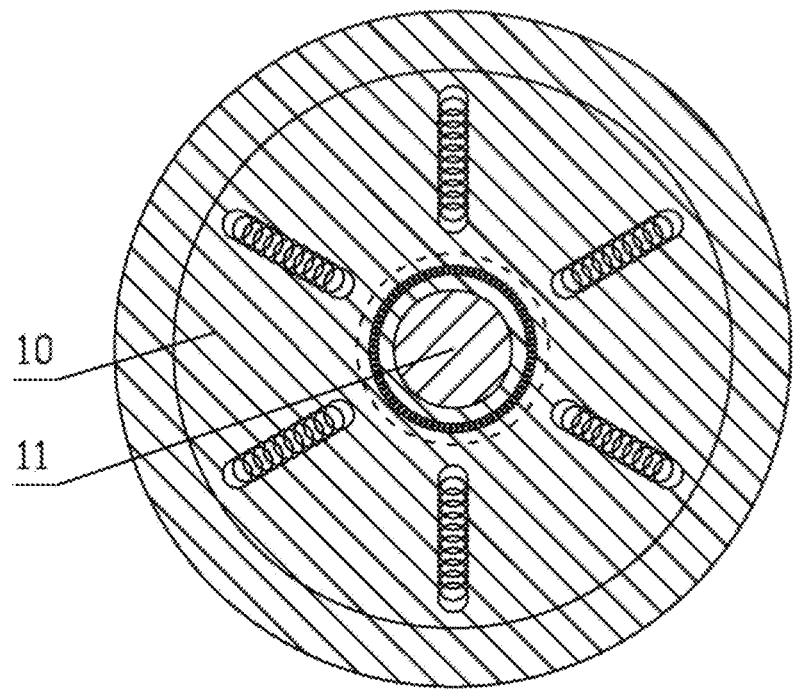
FIG. 3 is a schematic structural bottom view according to the present application.

As shown in FIGS. 1 to 3, an aluminum-cased cylindrical battery structure with electrolyte injected at the pole terminal includes a casing 1 equipped with a wound core 2 therein, with the top of the wound core 2 serving as a negative terminal and the bottom of the wound core 2 serving as a positive terminal, wherein the negative terminal includes a negative current collector plate 3 laser-welded to a negative tab of the wound core 2, a central portion of the negative current collector plate 3 is laser-welded to a stud flange 5 located at the bottom of a stud 4, a lower insulating sheet 6 is disposed between the negative current collector plate 3 and the casing 1, a sealing gasket 7 is disposed between the stud 4, the stud flange 5 and the casing 1, the stud 4 extends upward through a central hole of the casing 1 and is threadedly connected to a nut 8 provided on an outer side of the casing 1, an upper insulating sheet 9 is disposed between the nut 8 and the casing 1, and the threaded engagement portion between the nut 8 and the stud 4 is laser-welded, preventing loosening, sealing against dust, and achieving reliable electrical connection;
  the positive terminal includes a cover 10, the edge of the cover 10 is laser-welded to the bottom of the casing 1, the bottom of the cover 10 is laser-welded to a positive tab of the wound core 2, and an explosion-proof valve 11 is disposed at the middle portion of the cover to provide overpressure protection;
  an electrolyte injection hole 12 is disposed in the middle of the negative current collector plate 3 and the stud 4 for electrolyte injection, after electrolyte injection and formation, a sealing plug 13 is inserted into the electrolyte injection hole 12 of the stud 4, and the top end of the sealing plug 13 is laser-welded to the stud 4, effectively ensuring the reliability of sealing and electrical connection.

The upper portion of the electrolyte injection hole 12 of the stud 4 is a polygonal hole for positioning the stud in coordination with a wrench during locking, and the lower portion thereof is a circular hole.

The upper portion of the sealing plug 13 is a polygonal boss matched with the polygonal hole, and the lower portion thereof is a cylinder matched with the circular hole, achieving the sealing of the electrolyte injection hole 12.

The nut 8 is matched with the stud flange 5 to clamp and fix the upper insulating sheet 9, the casing 1, and the sealing gasket 7.

The nut 8 is flush with the top end of the stud 4, and the stud 4 is flush with the top end of the sealing plug 13.

The lower insulating sheet 6 is configured to isolate the short-circuit mode between the negative current collector plate 3 and the casing 1.

The sealing gasket 7 is configured to isolate the short-circuit mode between the stud 4, the stud flange 5 and the casing 1, and used for sealing purposes.

The upper insulating sheet 9 is configured to isolate the short-circuit mode between the nut 8 and the casing 1.

The nut 8 is made of aluminum, copper, nickel or nickel-plated copper, which can be flexibly selected for pack applications with a wide application range, and the sealing plug is made of nickel-plated copper.

The upper insulating sheet 9 and lower insulating sheet 6 are made of PP or PET.

Operating Principle:

During assembly, the stud flange 5 is first laser-welded to the negative current collector plate 3, and the sealing gasket 7 is then installed to form a composite current collector plate. Next, the negative current collector plate 3 is laser-welded to the negative tab of the wound core 2, the stud 4 is then placed facing upwards and the lower insulating sheet 6 is fastened above the negative current collector plate 3. The wound core 2 is then inserted into the casing 1 with the opening of the casing 1 facing downwards. The central protruding part of the sealing gasket 7 on the stud 4 extends through the circular hole at the top of the casing 1. The upper insulating sheet 9 is sleeved into the stud 4 above the casing 1, and the nut 8 is rotately installed onto the stud 4. When fastening, a hexagonal wrench of corresponding size should be inserted into the polygonal hole of the electrolyte injection hole 12 in the middle of the stud 4, and a socket wrench of corresponding size should be sleeved on the outside of the nut 8 and fastened clockwise to a fixed torque. At this time, the sealing gasket 7 will deform to form a seal. Then, the threaded engagement portion between the nut 8 and the stud 4 is laser-welded for fixation from the top, preventing the nut 8 from loosening and fusing the gap to ensure reliable electrical connection. The assembly of the negative terminal is now completed. Then, the cover 10 of the positive terminal is tightly pressed against the open side at the bottom of the casing 1, forming a tight pressure on the positive tab of the wound core 2. After pressing, peripheral laser welding is carried out, and then laser penetration welding is performed at the bottom of the cover 10 to achieve the electrical connection between the cover 10 and the internal positive tab. The assembly of the positive terminal is now completed. Electrolyte is then injected from the electrolyte injection hole 12 in the middle of the stud 4 and the negative current collector plate 3. After electrolyte injection and formation, the sealing plug 13 is inserted into the electrolyte injection hole 12 of the stud 4 and pressed tightly, followed by laser-welding to achieve the sealing of the whole wound core 2, thereby finishing the assembly of the whole cylindrical battery.

The above specific implementations cannot be taken as a limitation on the scope of protection of the present application, and for a person skilled in the art, any replacement, improvement or variation made to the implementations of the present application fall within the scope of protection of the present application.

All aspects not described in detail in the present application are known technologies to those skilled in the art.

The invention claimed is:

1. An aluminum-cased cylindrical battery structure with electrolyte injected at the pole terminal, comprising a casing equipped with a wound core therein, with the top of the wound core serving as a negative terminal and the bottom of the wound core serving as a positive terminal, wherein the negative terminal comprises a negative current collector plate laser-welded to a negative tab of the wound core, a central portion of the negative current collector plate is laser-welded to a stud flange located at the bottom of a stud, a lower insulating sheet is disposed between the negative current collector plate and the casing, a sealing gasket is disposed between the stud, the stud flange and the casing, the stud extends upward through a central hole of the casing and is threadedly connected to a nut provided on an outer side of the casing, an upper insulating sheet is disposed between the nut and the casing, and the threaded engagement portion between the nut and the stud is laser-welded;

the positive terminal comprises a cover, the edge of the cover is laser-welded to the bottom of the casing, the bottom of the cover is laser-welded to a positive tab of the wound core, and an explosion-proof valve is disposed at the middle portion of the cover;

an electrolyte injection hole is disposed in the middle of the negative current collector plate and the stud for electrolyte injection, after electrolyte injection and formation, a sealing plug is inserted into the electrolyte injection hole of the stud, and the top end of the sealing plug is laser-welded to the stud.

2. The aluminum-cased cylindrical battery structure with electrolyte injected at the pole terminal according to claim 1, wherein an upper portion of the electrolyte injection hole of the stud is a polygonal hole for locking and fixation, and a lower portion thereof is a circular hole.

3. The aluminum-cased cylindrical battery structure with electrolyte injected at the pole terminal according to claim 2, wherein an upper portion of the sealing plug is a polygonal boss matched with the polygonal hole, and a lower portion thereof is a cylinder matched with the circular hole.

4. The aluminum-cased cylindrical battery structure with electrolyte injected at the pole terminal according to claim 1, wherein the nut is matched with the stud flange to clamp and fix the upper insulating sheet, the casing, and the sealing gasket.

5. The aluminum-cased cylindrical battery structure with electrolyte injected at the pole terminal according to claim 1, wherein the nut is flush with the top end of the stud, and the stud is flush with the top end of the sealing plug.

6. The aluminum-cased cylindrical battery structure with electrolyte injected at the pole terminal according to claim 1, wherein the lower insulating sheet is configured to isolate the short-circuit mode between the negative current collector plate and the casing.

7. The aluminum-cased cylindrical battery structure with electrolyte injected at the pole terminal according to claim 1, wherein the sealing gasket is configured to isolate the short-circuit mode between the stud, the stud flange and the casing.

8. The aluminum-cased cylindrical battery structure with electrolyte injected at the pole terminal according to claim 1, wherein the upper insulating sheet is configured to isolate the short-circuit mode between the nut and the casing.

9. The aluminum-cased cylindrical battery structure with electrolyte injected at the pole terminal according to claim 1, wherein the nut is made of aluminum, copper, nickel or nickel-plated copper, and the sealing plug is made of nickel-plated copper.

10. The aluminum-cased cylindrical battery structure with electrolyte injected at the pole terminal according to claim 1, wherein the upper insulating sheet and lower insulating sheet are made of PP or PET.

* * * * *